US010319175B2

(12) United States Patent
Ditrani

(10) Patent No.: US 10,319,175 B2
(45) Date of Patent: Jun. 11, 2019

(54) CUP DISPENSER FOR A BEVERAGE VENDING MACHINE

(71) Applicant: EVOCA S.p.A., Milan (IT)

(72) Inventor: Marco Ditrani, Valbrembo (IT)

(73) Assignee: EVOCA S.P.A., Milan (IT)

( * ) Notice: Subject to any disclaimer, the term of this patent is extended or adjusted under 35 U.S.C. 154(b) by 0 days.

(21) Appl. No.: 16/080,778

(22) PCT Filed: Mar. 16, 2017

(86) PCT No.: PCT/IB2017/051544
§ 371 (c)(1),
(2) Date: Aug. 29, 2018

(87) PCT Pub. No.: WO2017/158555
PCT Pub. Date: Sep. 21, 2017

(65) Prior Publication Data
US 2019/0057570 A1 Feb. 21, 2019

(30) Foreign Application Priority Data
Mar. 16, 2016 (IT) .............................. 102016027772

(51) Int. Cl.
*G07F 11/54* (2006.01)
*G07F 13/10* (2006.01)
*B65G 59/10* (2006.01)

(52) U.S. Cl.
CPC ........... *G07F 13/10* (2013.01); *B65G 59/108* (2013.01); *G07F 11/54* (2013.01)

(58) Field of Classification Search
None
See application file for complete search history.

(56) References Cited

U.S. PATENT DOCUMENTS 3,283,951 A 11/1966 Gladfelder
3,520,444 A * 7/1970 Manzer .................. G07F 13/10
221/11

(Continued)

FOREIGN PATENT DOCUMENTS

EP 0339946 A2 11/1989
GB 1604306 A 12/1981

(Continued)

OTHER PUBLICATIONS

International Search Report and Written Opinion for International Application No. PCT/IB2017/051544 dated Aug. 30, 2017.

*Primary Examiner* — Gene O Crawford
*Assistant Examiner* — Ayodeji T Ojofeitimi
(74) *Attorney, Agent, or Firm* — Dorsey & Whitney LLP

(57) ABSTRACT

A cup dispenser for a beverage vending machine and comprising a magazine rotatably mounted about a rotation axis and provided with a plurality of columns arranged around the rotation axis and each adapted to store a respective stack of cups and provided with a respective release device operable to dispense individual cups. The cup dispenser further comprises a first actuator to rotate the magazine about the rotation axis and selectively bring the columns in a fixed cup dispensing station, a second actuator to operate the release device of the column in the dispensing station, a power takeoff powered by the second actuator, and a third actuator operable to selectively move the power takeoff to and from an engagement position, in which the power takeoff is kinematically coupled with a power input of the release device in the dispensing station.

10 Claims, 8 Drawing Sheets

(56) References Cited

U.S. PATENT DOCUMENTS

| | | | |
|---|---|---|---|
| 3,807,600 A | 4/1974 | Moss et al. | |
| 5,172,828 A * | 12/1992 | Ficken | G07F 11/54 221/105 |
| 6,550,638 B1 | 4/2003 | Mochida | |
| 2005/0082308 A1 * | 4/2005 | Simson | G07F 11/24 221/105 |
| 2014/0001195 A1 * | 1/2014 | Patterson | G07F 13/10 221/1 |

FOREIGN PATENT DOCUMENTS

| | | |
|---|---|---|
| GB | 2402386 A | 12/2004 |
| WO | 2013033026 A1 | 3/2013 |

* cited by examiner

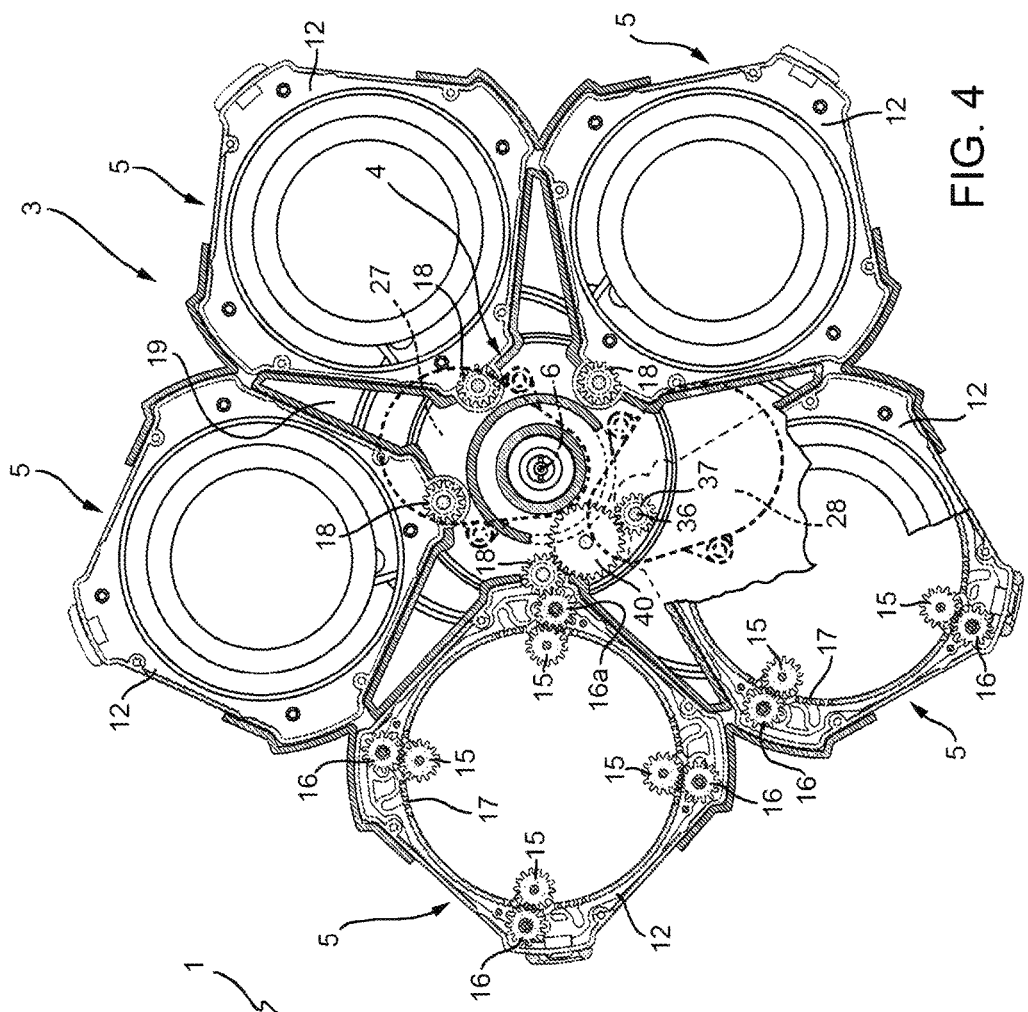
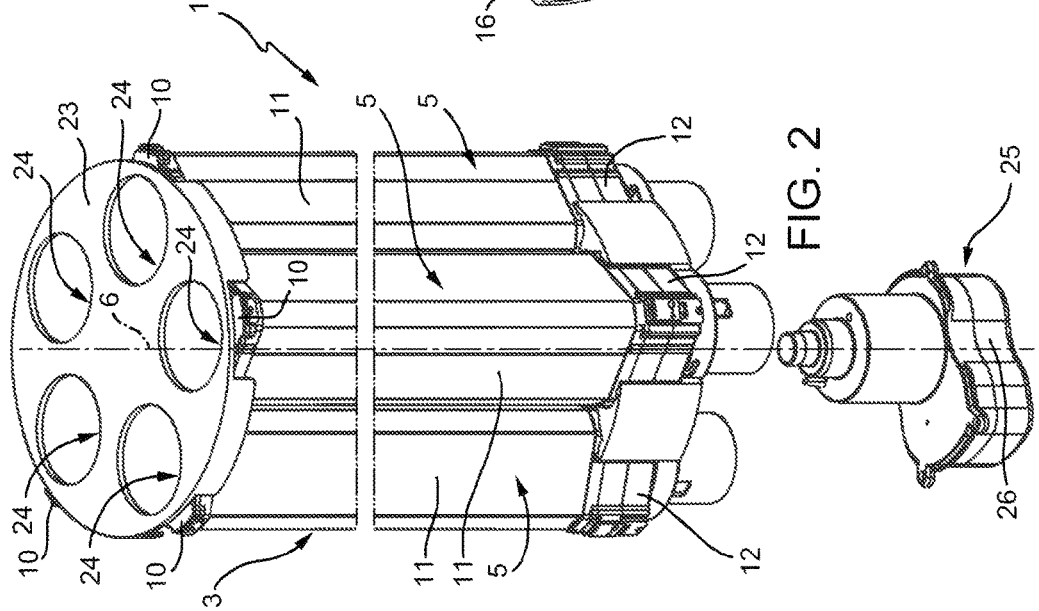

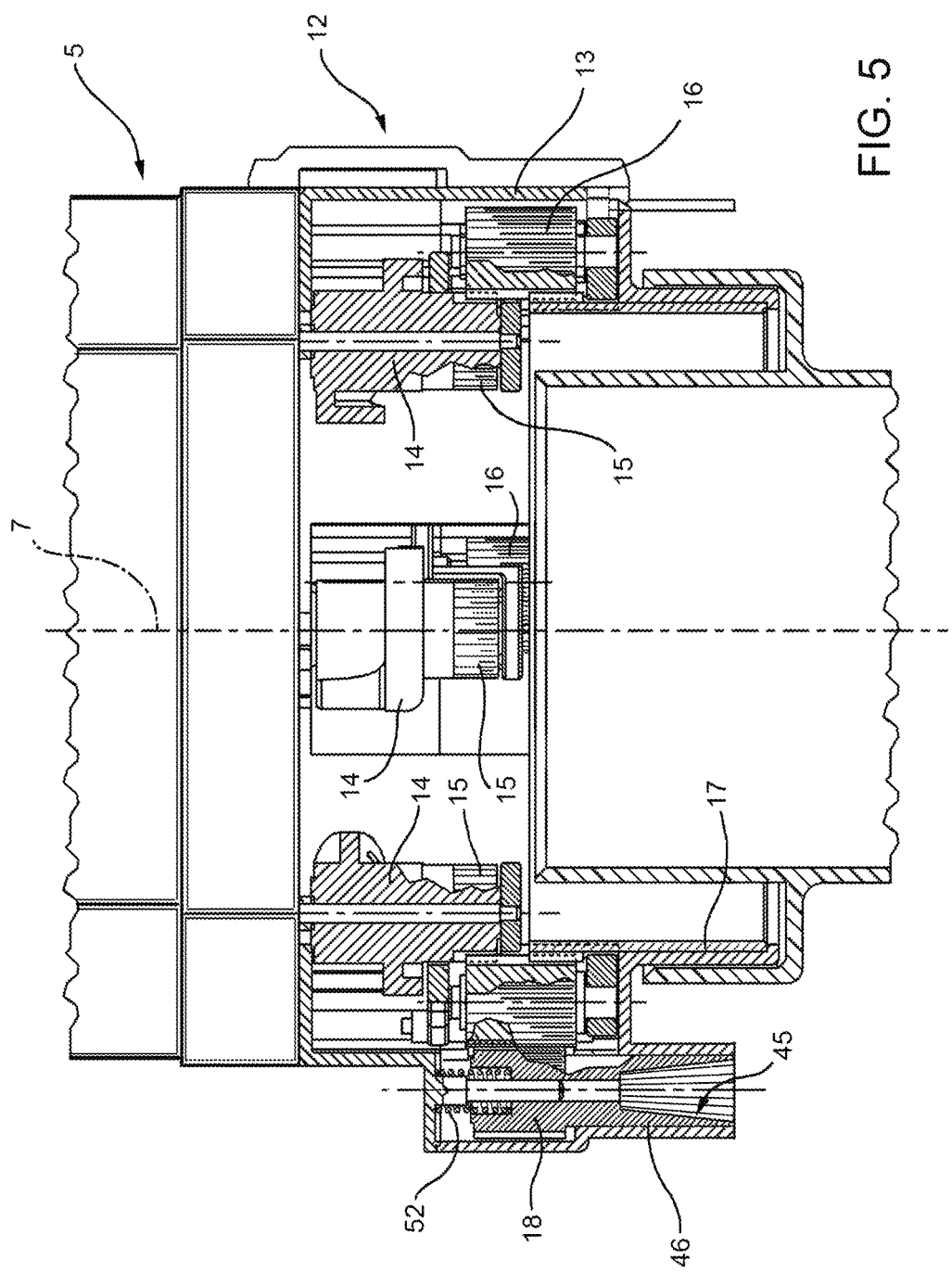

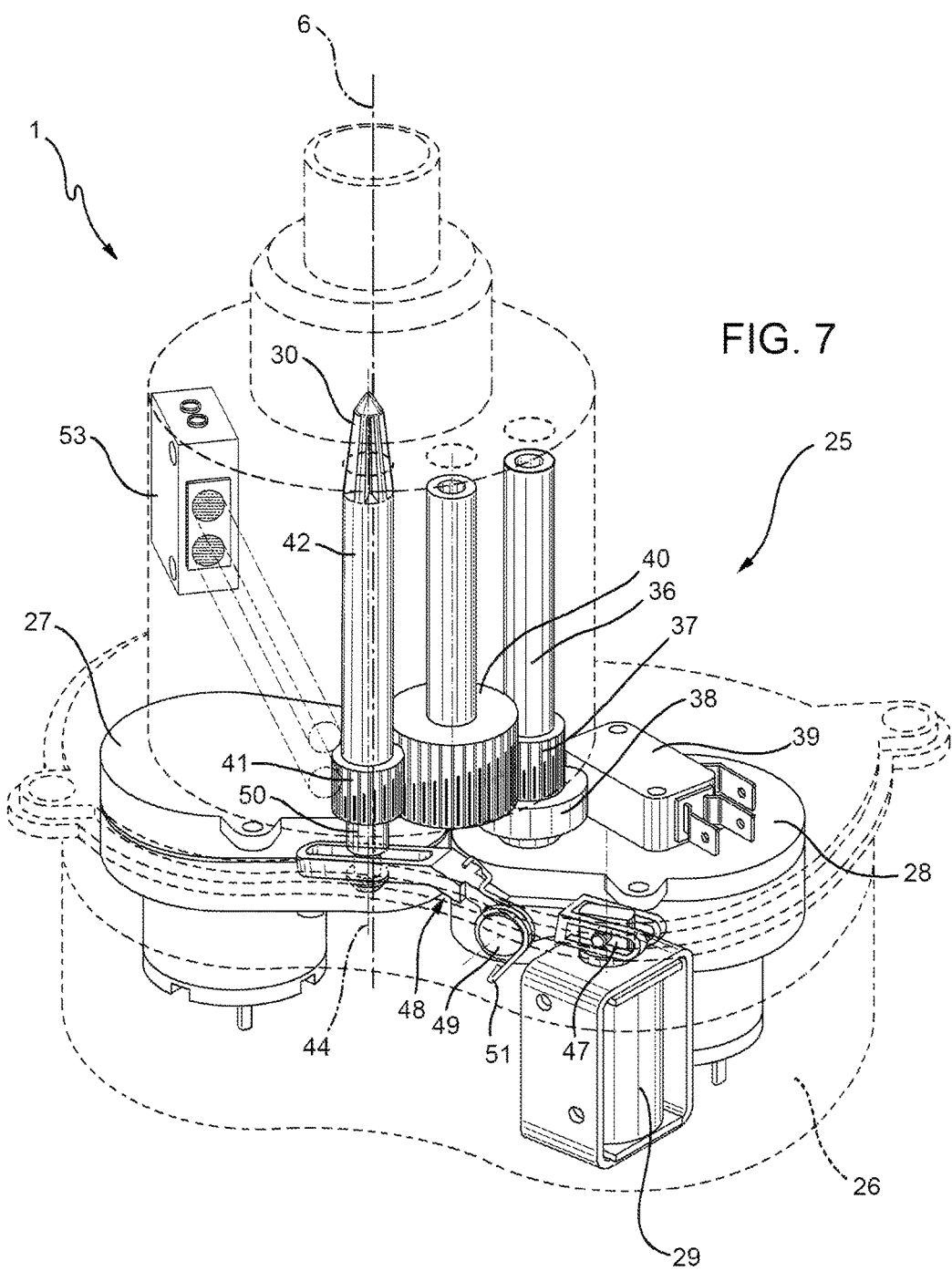

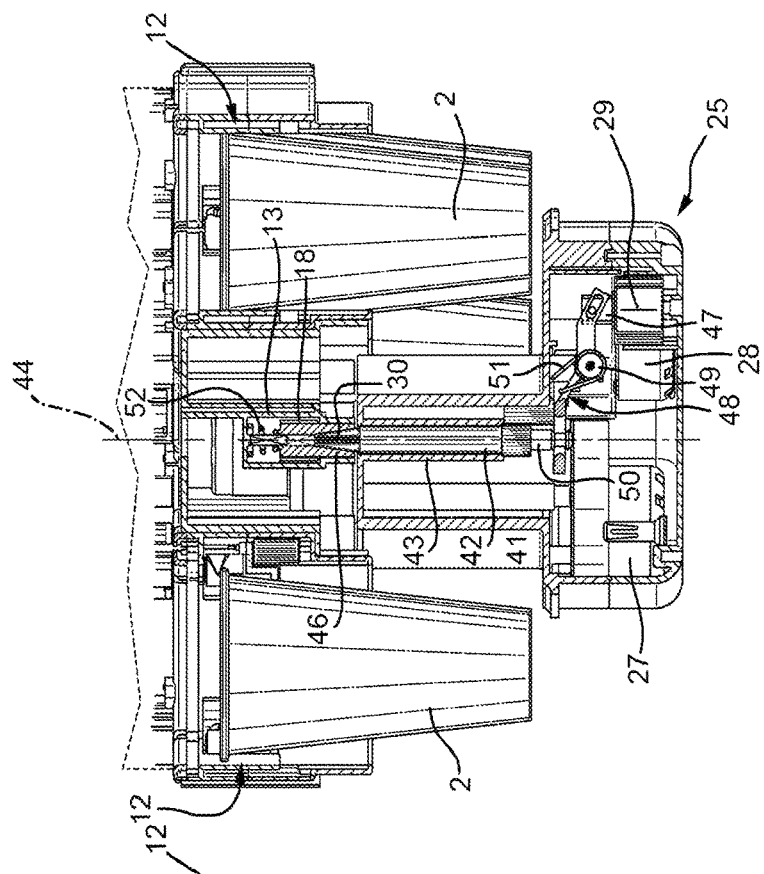
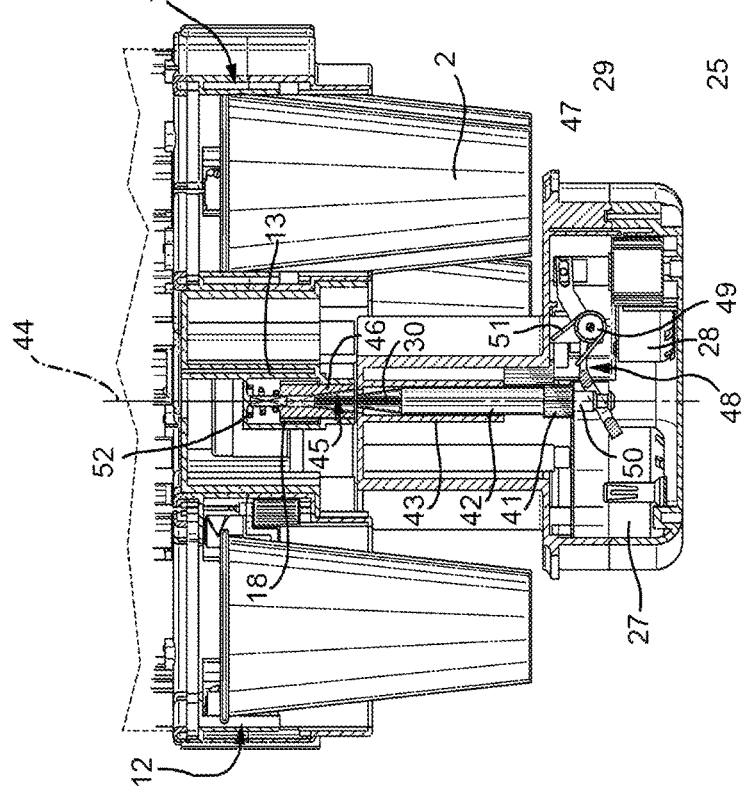

180
CUP DISPENSER FOR A BEVERAGE VENDING MACHINE

TECHNICAL FIELD

The present invention relates to a cup dispenser for a beverage vending machine.

Cup dispensers for beverage vending machines generally comprise a turret magazine, which is formed by a plurality of columns housing respective stacks of cups, and is rotatable about a central axis to individually bring the columns into a dispensing station, in which a cup is separated from the bottom of the respective stack of cups and made available for the subsequent beverage filling stage.

BACKGROUND ART

As is known, many types of cup dispensers are on the market, which in principle may be grouped into two main categories. A first category comprises cup dispensers in which the columns simply serve as receptacles for the respective stacks of cups, and are configured, when individually brought into the dispensing station, to engage a common release device for releasing one cup at a time from the stack.

This category includes, for example, the cup dispensers disclosed in U.S. Pat. Nos. 3,283,951 A, and 3,807,600 A, and WO 2013 033026 A1.

These cup dispensers generally have a relatively simple structure, but suffer from the limitation that they cannot be used to dispense cups of different sizes. In fact, each time a column is brought into the dispensing station, the respective stack of cups engages the release device in a non-reversible manner, and therefore the rotation of the columns in the dispensing station is only possible after the exhaustion of the cups of the stack that has previously engaged the release device.

A second category comprises cup dispensers in which the columns, in addition to serving as receptacles for the stacks of cups, are provided with respective release devices which can be selectively operated by means of a common actuator arranged in the dispensing station.

This category includes, for example, the dispensers disclosed in EP 0 339 946 A2, GB 2 402 386 A, GB 1 604 306 A.

The fact that each column is equipped with a respective release device allows each column to receive a stack of cups with a different size from that of the other columns and the columns to be selectively moved into the dispensing station depending on the cup to be used for the beverage selected by the user.

However, this advantage in terms of variety of cups that can be dispensed generally results in a greater structural complexity, in particular with regard to the aforementioned actuator, which must be designed not to interfere with the columns and the respective release devices during rotation of the magazine, and at the same time must be able to engage in a precise and stable, but also rapidly releasable manner, the release device arranged in the dispensing station so as to operate it, if a cup needs to be dispensed, or to let it move away as a result of the rotation of the magazine, if the size of the cup needs to be changed or the respective column has emptied.

DISCLOSURE OF INVENTION

The object of the present invention is to provide an improved cup dispenser, which allows the above-described known requirements to be met in a simple, inexpensive and reliable manner.

In accordance with the present invention, a cup dispenser for a beverage vending machine is provided as claimed in claim 1, and, preferably, in any one of the subsequent claims directly or indirectly depending thereon.

BRIEF DESCRIPTION OF THE DRAWINGS

The present invention will now be described with reference to the accompanying drawings, which illustrate a non-limiting embodiment thereof, in which:

FIG. 2 is a partially exploded, perspective view of the cup dispenser of FIG. 1;

FIG. 4 is a cross section, with parts removed for clarity, of the cup dispenser of FIG. 1;

FIG. 5 is a longitudinal section view of a detail of FIG. 1;

FIGS. 6 and 7 illustrate, in perspective and with parts removed for clarity, a further detail of FIG. 1 in two different operational configurations;

FIGS. 10 and 11 illustrate, along a different sectional plane and in two operational configurations, the detail shown in FIG. 9.

BEST MODE FOR CARRYING OUT THE INVENTION

Figure 1:
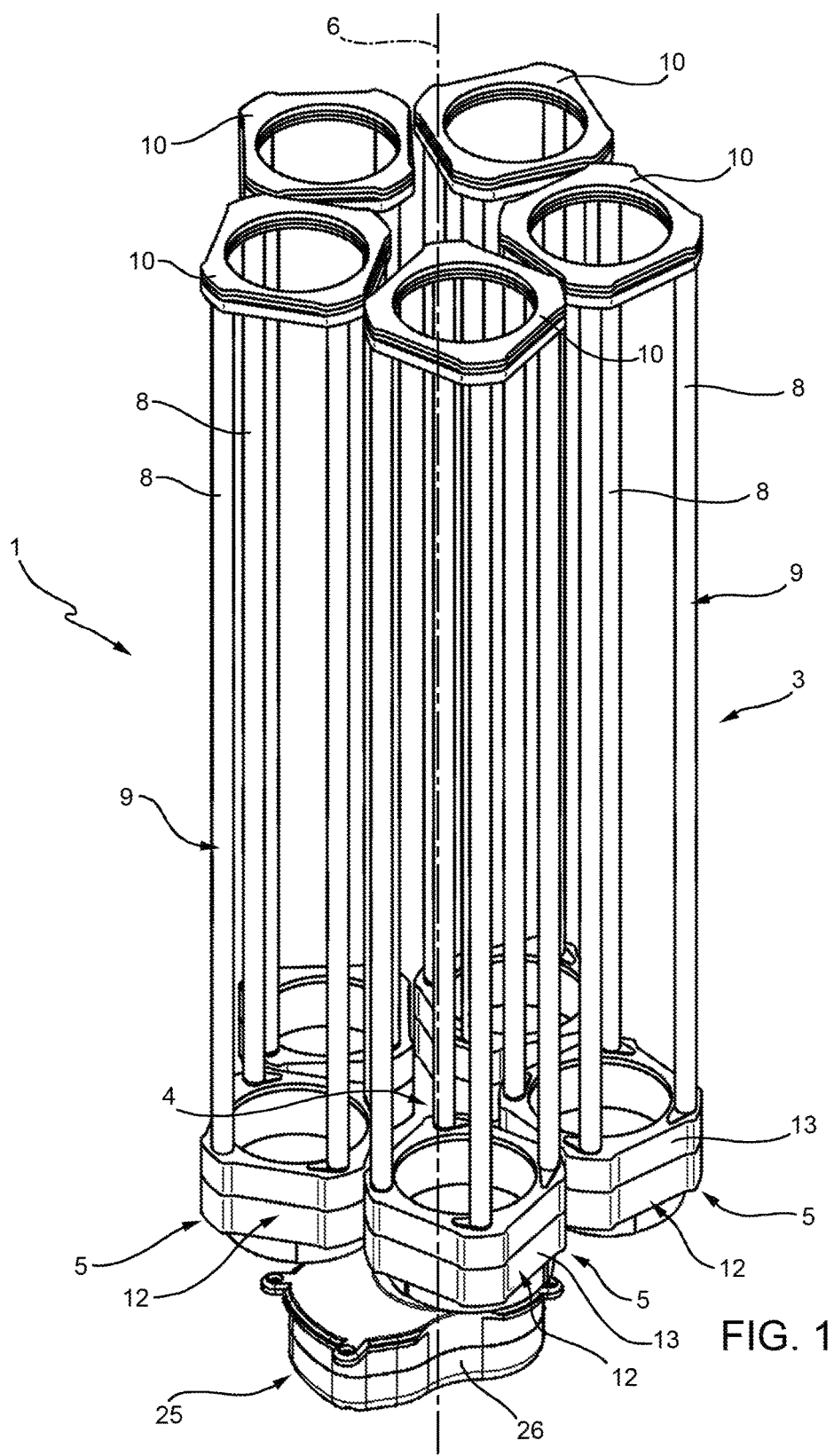
FIG. 1 shows, in perspective and with parts removed for clarity, a preferred embodiment of the cup dispenser according to the present invention.

In FIG. 1 a cup dispenser is designated as a whole by reference numeral 1.

In particular, the cup dispenser 1 of the present invention finds advantageous application in beverage vending machines, in which the cup dispenser 1 is normally operated at the beginning of a cycle for the preparation of a beverage to feed an empty cup to a filling station, in which a cup 2 is filled with ingredients of the beverage or with the beverage itself.

Figure 3:
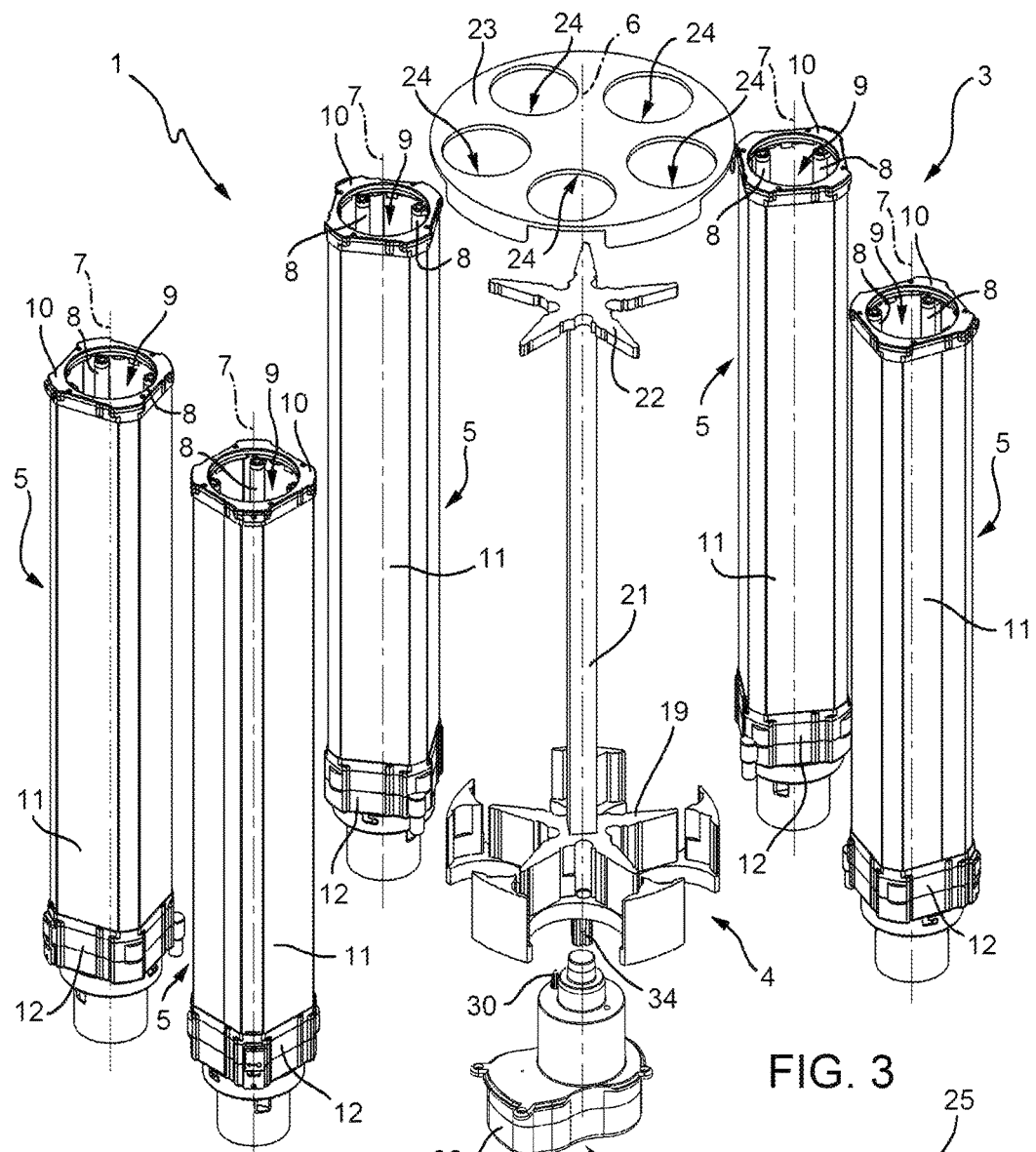
FIG. 3 is an exploded view of the cup dispenser of FIG. 1.
Figure 8:
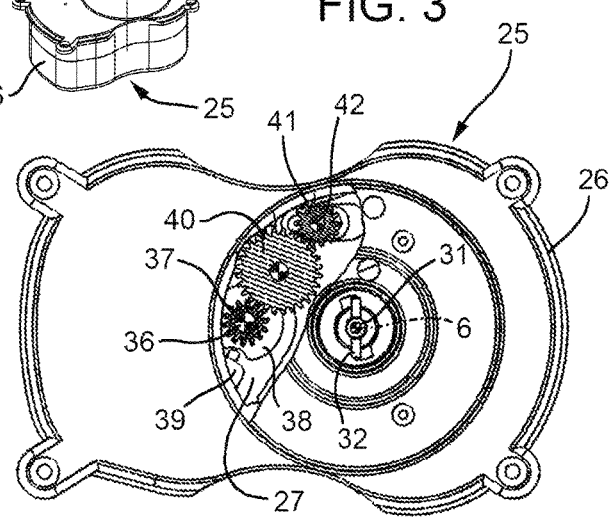
FIG. 8 is a plan view, with parts removed for clarity, of the detail of FIG. 6.

As shown in FIGS. 1, 2 and 3, the cup dispenser 1 comprises a turret magazine 3 comprising, in turn, a support drum 4 and a plurality of columns 5 removably mounted on the drum 4 around a rotation axis 6 of the turret magazine 3 and each adapted to receive a respective stack of cups 2 with a size equal to or different from the cups in the other stacks.

In particular, each column 5 has a longitudinal axis 7 parallel to axis 6 and comprises an upper containment portion bounded by a plurality of bars 8, four in the example shown, which are parallel to axis 6 and, as a whole, define a generally cylindrical cage 9 suitable to contain the respective stack of cups 2. The bars 8 of each cage 9 are connected to each other at respective upper free ends by a connecting annular member 10, and each cage 8 is laterally closed by means of a tubular casing 11 arranged all around the respective bars 8.

Each column 5 further comprises a lower portion, which is connected to the lower end of the respective bars 8 and comprises a release device 12 adapted to support the stack of cups 2 in the column 5 and, when operated, to release a single cup 2 from the bottom of the stack and let it fall downwards into a support device (not shown) for the subsequent filling with the beverage.

Preferably, as shown in FIGS. 4 and 5, the release devices 12 are of a cam type, and each comprise an outer annular body 13 coaxial with the axis 7 of the corresponding column 3, and cam members 14, which are rotatably mounted on the outer body 13 to rotate about respective axes parallel to axis 7, and are evenly distributed about the axis 7 to mutually define a falling channel for the cups 2.

The cam members 14 have a spiral profile (of known type) adapted to receive the edge of the last cup 2 so as to define, at rest, together with the other cam members 14, a substantially flat surface for supporting the entire stack of cups 2. During operation, when the cam members 14 are rotated simultaneously about their respective axes, the spiral profiles insert between the edges of the last and the second last cup 2 in the stack, causing separation, with the consequent fall of the last cup 2 from the rest of the stack, which keeps on resting on the cam members 14.

For the operation of the cam devices 14, each release device 12 is provided with a transmission, preferably of a gear type, which is adapted to be operated by an actuation assembly, described below, which is common to all release devices 12 and is arranged in the dispensing station.

In particular, as shown in FIGS. 4 and 5, each cam member 14 has a toothed cylindrical portion 15, which engages a respective gear 16 rotatably mounted on the outer body 13. All the gears 16 of the cam members 14 also engage the same crown wheel 17 and one of them, hereinafter designed by reference numeral 16a for the purpose of clarity, also engages a power input gear 18, described in more detail below. During operation, a rotation of the gear 18 is transmitted from the gear 16a to the crown wheel 17, which, via the other gears 16, causes simultaneous rotation of the cam members 14.

As shown in FIGS. 2 and 3, the drum 4 comprises a shaped base 19 having, along perimeter thereof, a plurality of seats 20, each designed to accommodate the release device 12 of a respective column 5. Preferably, the magazine 3 has an axisymmetric shape with respect to axis 6 and, thus, the seats 20 are evenly distributed around the axis 6. As shown in FIG. 4, the release devices 12 are oriented in the respective seats 20 with their respective power input gears 18 arranged on the side of the respective seats 20 closest to axis 6 and distributed along a circumference coaxial with the axis 6.

With reference to FIG. 3, the drum 4 has a central stem 21, which projects upwardly from the base 19 coaxially with the axis 6, and is connected at its upper free end to a spacer plate 22, which serves to ensure the correct position of the columns 5 and, for this purpose, has a plurality of peripheral recesses aligned vertically with the seats 20, each adapted to be engaged by the annular member 10 of the respective column 5. The correct position of the columns 5 in the magazine 3 is further ensured by a cover 23, which covers and holds together all the annular members 10 and has openings 24 arranged next to the columns 5 to allow the stacks of cups 2 to be loaded.

The cup dispenser 1 also comprises an actuator assembly 25, which, during operation, performs the dual function of rotating the magazine 3 around the axis 6 to selectively bring the columns 5 into a fixed cup dispensing station (not shown), and of operating the release device 12 of the column 5 which is in the dispensing station.

As shown in FIGS. 6 to 11, the actuator assembly 25 is arranged below the base 19 of the drum 4, and comprises an outer casing 26, which houses a motor reducer 27 to rotate the magazine 3, a motor reducer 28 to operate the release devices 12, and an actuator 29 to control a coupling 30 operated by the motor reducer 28 to kinematically couple or uncouple the motor reducer 28 and the release device 12 arranged in the dispensing station.

Figure 6:
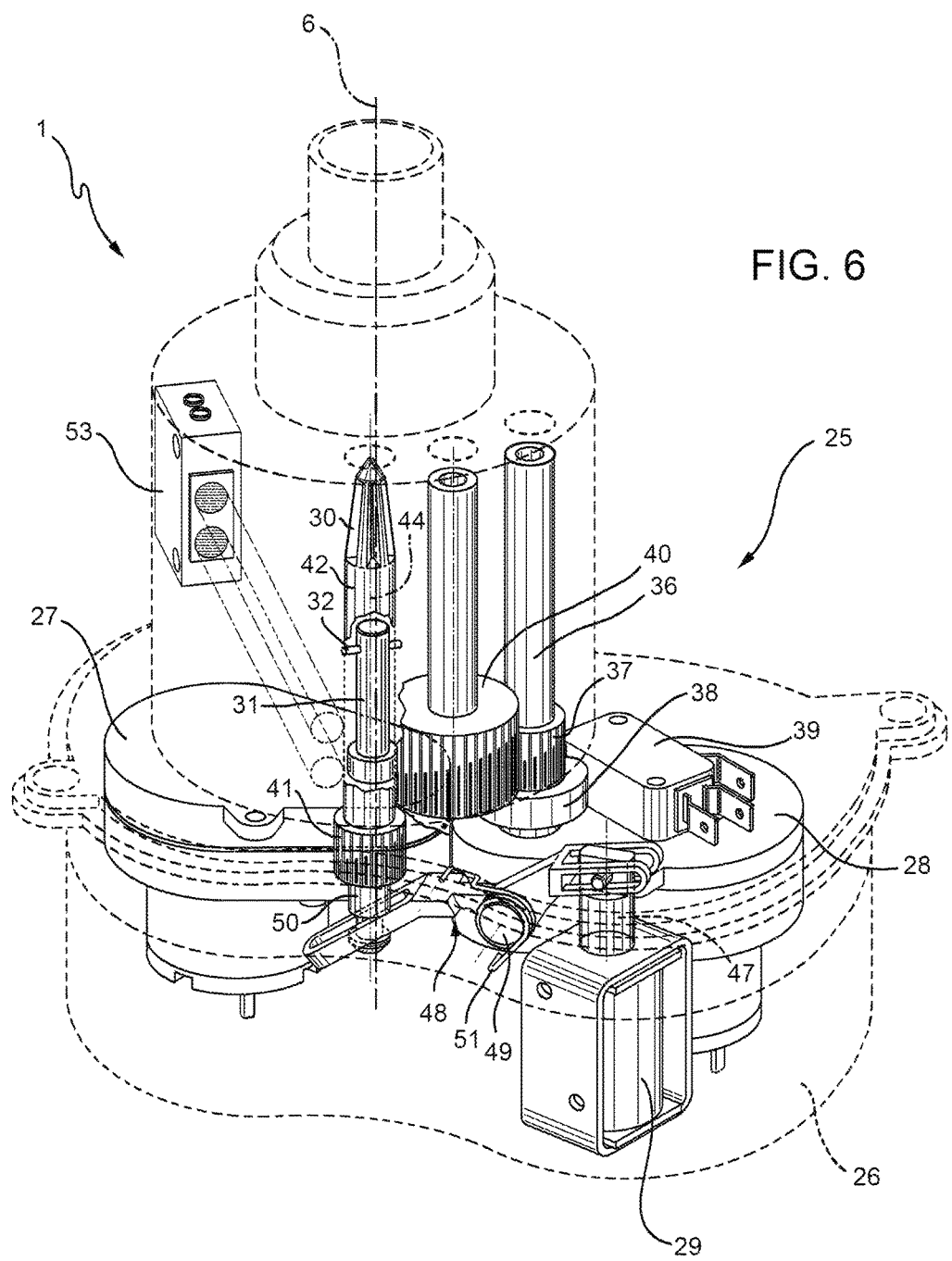
Figure 9:
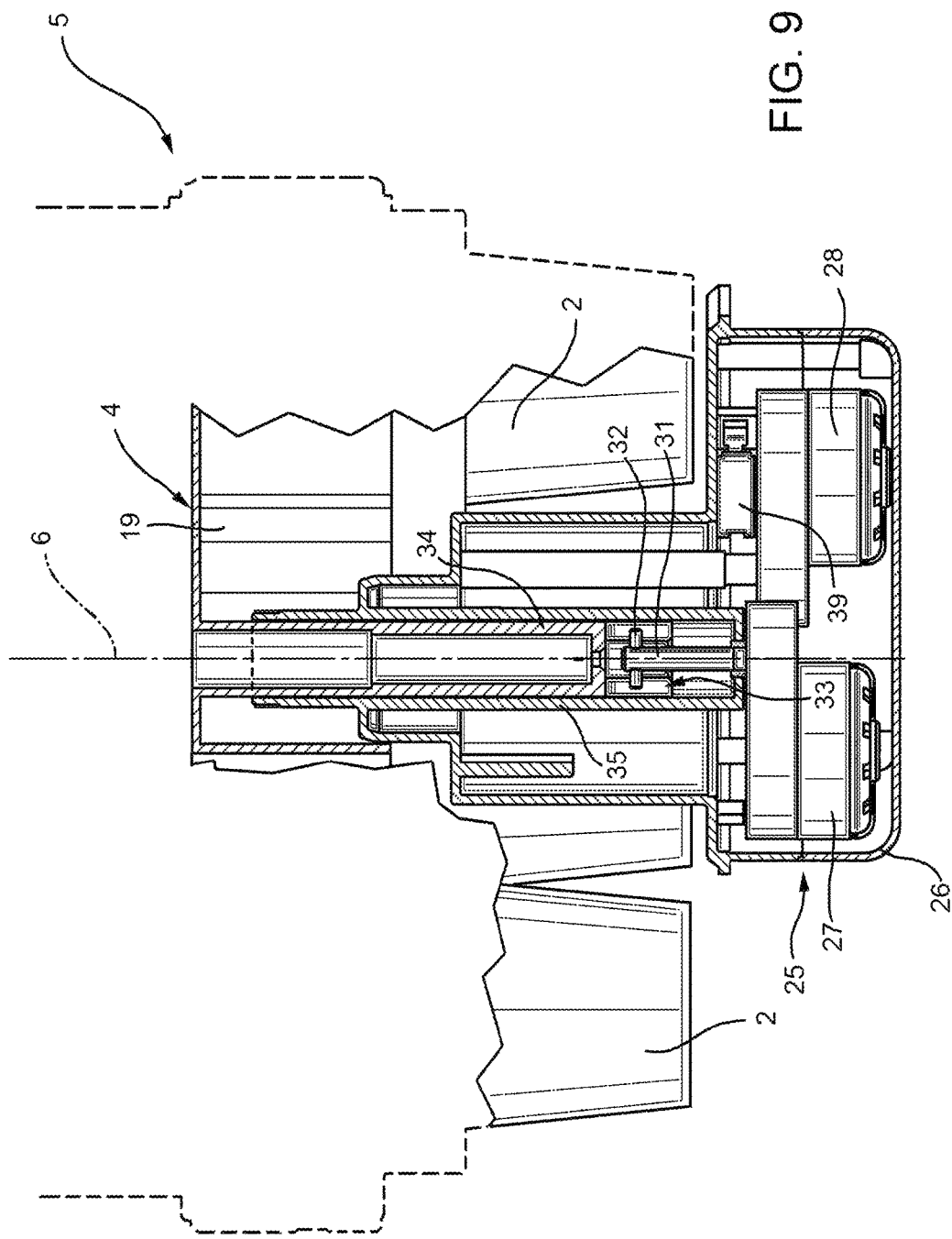
FIG. 9 illustrates, in enlarged scale, and with parts in section and parts removed for clarity, a detail of FIG. 1.

As shown in FIGS. 6 and 9, the motor reducer 27 has an output shaft 31 coaxial with axis 6, and angularly coupled to a connecting member carried by the drum 4, so as to rotate the magazine 3 around the axis 6 when the motor reducer 27 is operated.

The output shaft 31 and the connecting member may be angularly coupled by means of any mechanical solution fit for the purpose; in the shown example (FIG. 9), it is attained by a form-fitting connection between a pin 32, which extends through the free end of the output shaft 31 perpendicular to the axis 6, and a slot 33 formed at the distal end of a cylindrical appendage 34 projecting downwards from the base 19 coaxially with the axis 6 and defining the connecting member.

Preferably, in order to stabilize the connection between the drum 4 and the actuating assembly 25, the cylindrical appendage 34 is inserted inside a sleeve 35, which is part of the casing 26, is coaxial with axis 6, and surrounds the output shaft 31.

As shown in FIGS. 6, 10 and 11, the motor reducer is arranged laterally adjacent to the motor reducer 27, and has an output shaft 36, which is rotatable about an axis parallel to the axis 6 and carries a keyed gear 37 and a keyed cam 38 which cooperates with a microswitch 39 to control rotation of the motor reducer 28.

The gear 37 is coupled to a gear 40 idly supported by the casing 26 and coupled, in turn, to a gear 41 keyed to a pin 42, which is axially slidingly arranged in a guiding sleeve 43 integral with the casing 26, and has an axis 44 parallel to the axis 6.

As shown in FIGS. 4 and 10, the motor reducer 28 and the transmission formed by the gears 37, 40 and 41 are arranged below the drum 4 so that the gear 41, and hence the pin 42, are coaxial with the power input gear 18 of the release device 12 arranged in the dispensing station.

The pin 42, at an upper axial end thereof facing the drum 4, has a conical grooved portion, which defines the coupling 30 and is axially movable with the pin 42 along the axis 44, between a normal retracted rest position (FIG. 10), in which the coupling 30 fails to engage the release device 12, and preferably fails to protrude outside the upper end of the sleeve 41, and an extracted operating position, in which the coupling 30 engages a conical, grooved recess 45 coaxial with the axis 6 and formed in a hub 46 defined by a lower appendage of the power input gear 18. The coupling between the grooved profiles of the coupling 30 and of the conical recess 45 allows the pin 42 and the power input gear 18 to angularly lock, and the output shaft 36 of the motor reducer 28 and the cam members 14 which release the cups 2 to kinematically connect. In other words, the pin 42 together with the coupling 30 defines a power takeoff powered by the motor reducer 28 and adapted to be moved, as explained below, to and from a kinematic coupling position, in which the power input of the release device 12 is arranged in the dispensing station.

The actuation of the pin 42, and, resultingly, of the coupling 30, between the above-mentioned lowered rest position and raised operative position is performed by the actuator 29 via a transmission member configured to impart the pin 42, under the thrust of the actuator 29, a translational motion along the axis 44.

For this purpose, the actuator 29 is preferably linear, conveniently of a solenoid type, and has an output member 47 movable in a direction parallel to the axis 44, and slidably and rotatably engages an oblong slot formed at a free end of a first arm of a rocker arm 48 rotatably mounted on a fulcrum pin 49, transverse to the axis 44 and arranged between the actuator 29 and the pin 42. The rocker arm 48 also comprises a second arm, which is opposite to the first arm and has at a free end thereof an oblong slot slidably and rotatably engaged by a tang 50 formed at the axial end of the pin 42 opposite to the coupling 30.

In a normal inoperative or rest position shown in FIGS. 6 and 10, the output member 47 of the actuator 29 is arranged in an extracted position and the rocker arm pushes the pin 42 downwards into said lowered rest configuration.

When the actuator 29 is powered, the output member 47 moves back, causing the rocker arm 48 to rotate against the action of a return spring 51 mounted on the pin 49, and consequently causing the second arm which pushes the pin 42 to lift upwardly into the operational position in which it engages the conical recess 45. The actuator 29 is kept powered for an entire cup dispensing stage, during which the motor reducer 28 is operated to cause the pin 42 and, through the coupling 30, the power input gear 18 to rotate and the rotary motion to be simultaneously transferred, through the gear 16*a* and the crown wheel 17, to all the cam members 14. The rotation of the cam members 14 is controlled by an electronic control unit (not shown) which is connected to the microswitch 39 associated with the cam 38.

After a cup 2 has been dispensed, the actuator 29 is unpowered and the rocker arm 48 is caused by the spring 51 to rotate about the pin 49, so resulting in the output member 47 raising and in the pin 42 lowering, with consequent disengagement of the coupling 30 from the conical recess 45. According to a variant, not shown, the spring 51 is replaced by a bistable mechanism, which is adapted to assume a first stable position, in which it maintains the pin 42 in the lowered rest position, and a second stable position, in which it maintains the pin 42 in the raised operative position. The actuator 29 is powered to move the bistable mechanism from a stable position to the other.

The pin 42 remains in the lowered rest position until next beverage selection. In this case, if the selected beverage requires the same cup previously selected and the column 5 arranged in the dispensing station is not empty, the magazine 3 is not moved and the operating steps described above are repeated to couple the release device 12 to the motor reducer 28, actuate the cam members 14, and finally uncouple the release device 12 from the motor reducer 28.

Instead, if the selected beverage requires a cup of a different size from that of the previously dispensed cup, the motor reducer 27 is actuated to rotate the magazine 3 around the axis 6 and bring the first column 5 containing the cups 2 of the desired size into the dispensing station.

In this regard, it should be mentioned that the cup dispenser 1 is provided with an electronic control system operable to recognize the columns 5 and to control their movement around the axis 6. In particular, the electronic control system comprises a plurality of position sensors, preferably of a magnetic type, which output electrical signals supplied to the column electronic control unit, which is configured to control operation of the actuator 27, and, resultingly, rotation of the magazine 3 based on the electrical signals from the position sensors and on identification data of the columns 5.

In practice, when the drum 4 is rotated, the electronic control system recognizes when a specific column 5 reaches the release station and when the drum 4 must be stopped, so accurately ensuring that when a release device 12 is brought into the dispensing station, the corresponding power input gear 18 is coaxial with the pin 42.

Any angular deviations, always possible despite the system accuracy, are adjusted by the coupling 30 by virtue of its conical shape at the time when the coupling 30 engages the conical recess 45.

According to a variant, not shown, the actuator 29 may be configured to maintain the coupling 30 normally engaged. In this case, the actuator 29 is powered to disengage the coupling 30 only when the selection of a beverage or the emptying of the column 5 requires the rotation of the magazine 3.

Preferably, as shown in FIG. 5, to ensure that the coupling between the coupling 30 and the hub 46 occurs in an accurate and precise manner, each power input gear 18 is mounted on its corresponding release device 12 with the interposition of a helical spring 52 adapted to normally maintain the gear 18, and hence the hub 46, pushed downwards against a stop shoulder and to allow an elastic excursion towards the top of the gear 18 when the coupling 30 engages the conical recess 45. In addition to this function, the spring 52 also has the function of maintaining the gear 18 angularly fixed when it is in a rest condition.

Lastly, as shown in FIGS. 6 and 7, the cup dispenser 1 comprises an optical sensor 53 connected to the electronic control unit and mounted on the actuating assembly 25 in such a position as to allow the electronic control unit to detect the presence or absence of the cups 2 inside a column 5 when the latter reaches the dispensing station, in order for the column to stop or run through the dispensing station, and to consequently control rotation of the magazine 3 in case there are no cups 2 in the column 5 at the dispensing station.

The invention claimed is:

1. A cup dispenser for a beverage vending machine, the cup dispenser comprising:
    a magazine rotatably mounted about a rotation axis and provided with a plurality of columns arranged around the rotation axis, each of the plurality of columns is adapted to store a respective stack of cups and is provided with a respective release device operable to dispense individual ones of the cups;
    a first actuator operable to rotate the magazine about the rotation axis and selectively bring the plurality of columns in a fixed cup dispensing station;
    a second actuator operable to operate the release device of a respective one of the plurality of columns in the fixed cup dispensing station;
    a power takeoff powered by the second actuator; and
    a third actuator operable to selectively move the power takeoff to and from an engagement position, in which the power takeoff is kinematically coupled with a power input of the respective release device in the fixed cup dispensing station.

2. The cup dispenser of claim 1, wherein the power takeoff is adapted to move between a disengagement position in which the power takeoff fails to interfere with the release devices when the release devices pass through the fixed cup dispensing station during the rotation of the magazine, and the engagement position in which the power takeoff is coupled with the power input of the release device of one of the plurality of the columns containing the cups to be extracted.

3. The cup dispenser of claim 2, wherein the power takeoff is moved to and retained in the engagement position only for the time necessary for dispensing the cup.

4. The cup dispenser of claim 1, wherein:
each of the release devices includes a plurality of release elements and a respective transmission having an input that defines the power input and having a gear, the gear including a central part that defines a hub; and
the power takeoff is defined by a pin configured to fit into the hub to result in the pin being angularly coupled with said gear.

5. The cup dispenser of claim 4, wherein the pin includes a conical fitting end having a grooved profile.

6. The cup dispenser of claim 5, wherein the second actuator is operable to rotate the pin and operate the release devices.

7. The cup dispenser of claim 5, wherein the first, second and third actuators are mounted to form a compact actuator assembly housed in a box-shaped casing arranged below the magazine.

8. The cup dispenser of claim 7, further comprising:
an optical sensor mounted to the compact actuator assembly; and
an electronic control unit connected to the optical sensor and configured to detect, based on an output of the optical sensor, a presence or an absence of the cups one of the plurality of columns the latter stops or runs through the fixed cup dispensing station, and to consequently control rotation of the magazine if no cup is in the column at the fixed cup dispensing station.

9. The cup dispenser of claim 7, wherein the third actuator includes a linear actuator and is adapted to move the pin between a lowered position defining the disengagement position, and a raised position defining the engagement position in which the pin axially fits into the hub.

10. The cup dispenser of claim 9, further comprising:
wherein the third actuator includes a solenoid actuator;
a rocker arm transmission is arranged between a linear output member of the third actuator and the pin to move the pin from a normal position thereof when the third actuator is activated; and
elastic return means operable to move the pin back into the normal position when the third actuator is deactivated.

* * * * *